July 21, 1953

K. R. RUNDE 2,645,848

CUTTING DEVICE

Filed Nov. 6, 1950

INVENTOR.
KENNETH R. RUNDE
BY
ATTORNEY

July 21, 1953  K. R. RUNDE  2,645,848
CUTTING DEVICE
Filed Nov. 6, 1950  3 Sheets-Sheet 2
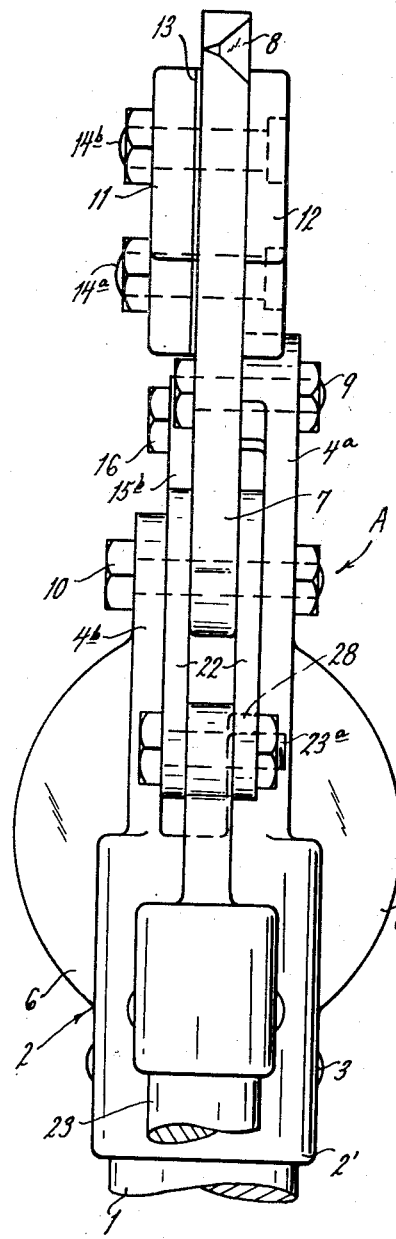
FIG. 3.
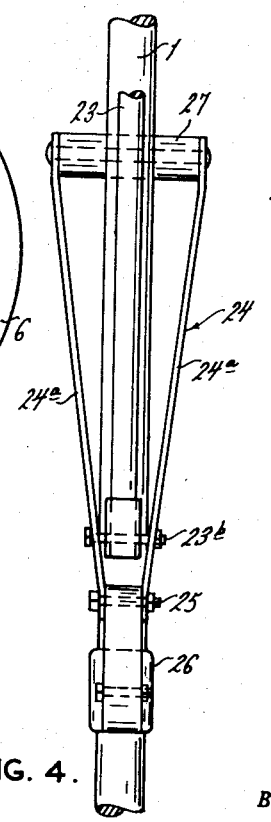
FIG. 5.
FIG. 4.
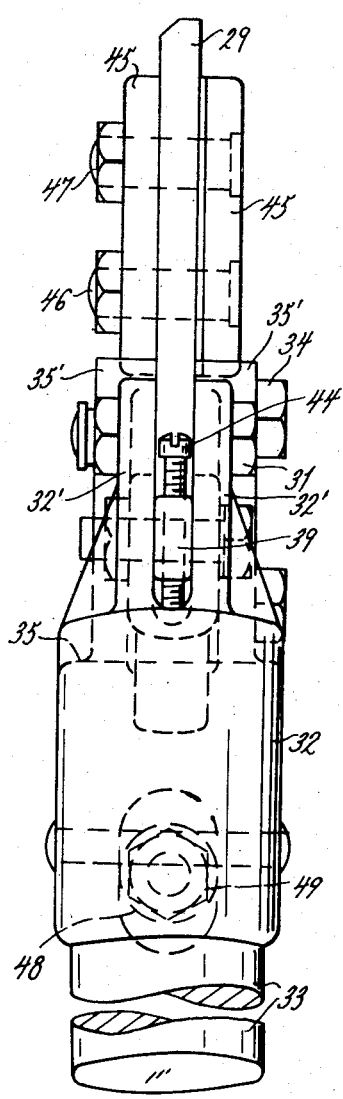
FIG. 6.
INVENTOR.
KENNETH R. RUNDE
BY
*E. M. Harrington*,
ATTORNEY July 21, 1953

K. R. RUNDE 2,645,848

CUTTING DEVICE

Filed Nov. 6, 1950

INVENTOR.
KENNETH R. RUNDE
BY
*E. M. Harrington*
ATTORNEY

Patented July 21, 1953

2,645,848

UNITED STATES PATENT OFFICE 2,645,848

CUTTING DEVICE

Kenneth R. Runde, Lemay, Mo., assignor to James R. Kearney Corporation, St. Louis, Mo., a corporation of Missouri Application November 6, 1950, Serial No. 194,297

6 Claims. (Cl. 30—177)

This invention relates generally to cutting devices and more specifically to cutting devices of the type employed by linemen for cutting wires, cables, and the like, in the construction, repair, and maintenance of electrical distribution systems, the predominant object of the invention being to provide a cutting device of the type referred to above having a blade which is capable of being adjusted with respect to a related blade in a unique manner so as to cause the cutting edges of said blades to properly perform the cutting operation.

Fig. 3 is a fragmentary edge elevation taken on line 3—3 of Fig. 2.

Fig. 4 is a fragmentary elevation taken on line 4—4 of Fig. 1.

Fig. 5 is a section taken on line 5—5 of Fig. 2.

Fig. 6 is a fragmentary edge elevation of a modified form of the invention.

Figures 1, 2:
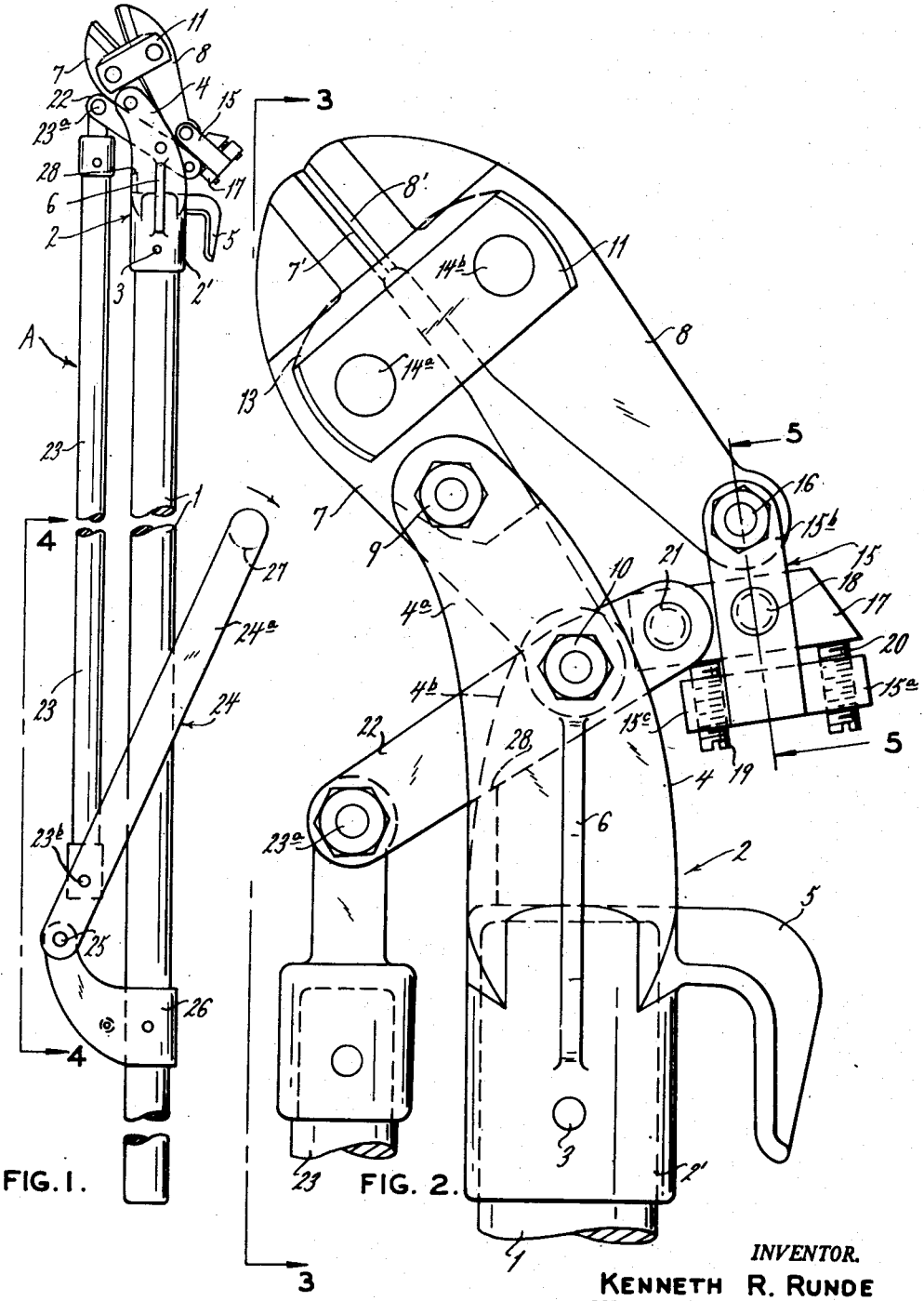
Fig. 1 is a side elevation of a cutting device constructed and arranged in accordance with this invention, portions of the device being broken away.
Fig. 2 is an enlarged, fragmentary side elevation of a portion of the device shown in Fig. 1.

In the drawings, wherein are shown for purposes of illustration, merely, two embodiments of the invention, A designates the improved cutting device generally in Fig. 1. The cutting device A includes an elongated handle 1 in the form of a pole, said handle having mounted thereon at its upper end a bracket member 2 which is provided with a socket portion 2' that receives an end portion of the handle. The bracket member is secured to the handle 1 by means of a pin 3, and extended upwardly from the socket portion of the bracket member 2 is a bifurcated portion 4. By referring to Fig. 3 it will be noted that the leg 4a of the bifurcated portion 4 is longer than the leg 4b thereof, and Fig. 2 shows that the longer leg 4a is curved laterally while the shorter leg 4b is alined with the axis of the handle 1. The bracket member 2 is provided with a hook-shaped part 5 which is useful in hanging the cutter when same is not in use, and also said bracket member is provided at its opposite sides with strengthening ribs 6.

The improved cutting device of this invention includes a fixed blade 7 and a movable blade 8, said blades being provided with cutting edges 7' and 8'. The fixed blade 7 is secured at an intermediate portion thereof by means of a bolt 9 to the upper end portion of the longer leg 4a of the bracket member 2, and the lower portion of said fixed blade is secured by a bolt 10 to and in position between the upper portion of the shorter leg 4b of the bracket member 2 and an adjacent, spaced part of the longer leg 4a of said bracket member. The movable blade 8 is secured to the fixed blade 7 by a pair of plates 11 and 12, the plate 11 being arranged at one side of the blade assembly and the plate 12 being arranged at the opposite side of the blade assembly, there being a thin sheet 13 of material interposed between the plate 11 and the adjacent side faces of the blade. The plates 11 and 12 are secured to the blades 7 and 8 so as to connect said blades together by bolts 14a and 14b which extend through apertures formed through the plates and the blades, said bolts 14a and 14b passing also through apertures formed through the thin sheet 13 of material.

The movable blade 8 is supported for pivotal movement by the bolt 14b and at its lower end said movable blade has mounted thereon a member 15, said member having a base portion 15a and spaced, upwardly extended legs 15b (Figs. 2 and 5), the base portion of said member 15 having laterally projected extensions 15c formed thereon. The member 15 is secured to the lower portion of the movable blade 8 by a bolt 16 whose shank portion extends through alined apertures formed through the spaced legs of the member 15 and through the blade 8. Disposed between the spaced legs 15b of the member 15 is a bar 17 which is supported for pivotal movement with respect to said member 15 by a pin 18 that extends through openings formed through said spaced legs of said member 15 and through said bar 17. The bar 17 is supported by the pin 18 relative to the member 15 so that its lower face is spaced upwardly from the top faces of the base portion of said member 15 and the extensions 15c thereof, as is shown to good advantage in Fig. 2. Also, the extensions 15c of the base portion of the member 15 are provided with screwthreaded openings in which are screwthreadedly disposed adjusting elements 19 and 20, the upper ends of these adjusting elements contacting with the lower face of the bar 17.

Pivotally attached to an end portion of the bar 17 through the instrumentality of a pin 21 is an arm 22, said arm being supported for oscillatory movement by the previously mentioned bolt 10. At its opposite end the arm 22 has pivotally attached thereto by means of a bolt 23a the upper end of a link 23, the lower end of said link being pivotally connected by a bolt 23b to a lever structure 24, the lever structure 24 being attached by means of a bolt 25 to a bracket 26 which is secured to the handle 1 (Fig. 1). The lever structure 24 is shaped as is shown to good advantage to Fig. 4, said lever structure comprising a pair of arms 24a which diverge from their points of attachment to the bracket 26 and which have supported between their outer end portions a hand grip 27.

In the use of the cutting device shown in Figs. 1 to 5, inclusive, the device is held in position for use by the handle 1 being grasped by a user of the device. The outer free end portion of the lever structure 24 is then jerked downwardly so as to bring the cutting edges toward each other and sever the article which is being cut with the aid of the cutting device.

The blade 8 is adjustable relative to the blade 7 so that the cutting edges 7' and 8' thereof just meet when the arm 22 contacts with the abutment 28 at the limit of the downward stroke of the arm 22. This is essential because if the cutting edges of the blades were permitted to come into sharp contact with each other said cutting edges probably would be damaged. The blade adjustment referred to is accomplished by screw-threadedly adjusting the adjusting elements 19 and 20 in a manner to move the bar 17 about the pin 18 to desired positions of adjustment. The result being that the relationship between the bolt 16 and the pin 21 will be altered and the position of the blade 8 with respect to the blade 7 will be changed.

Figure 7:
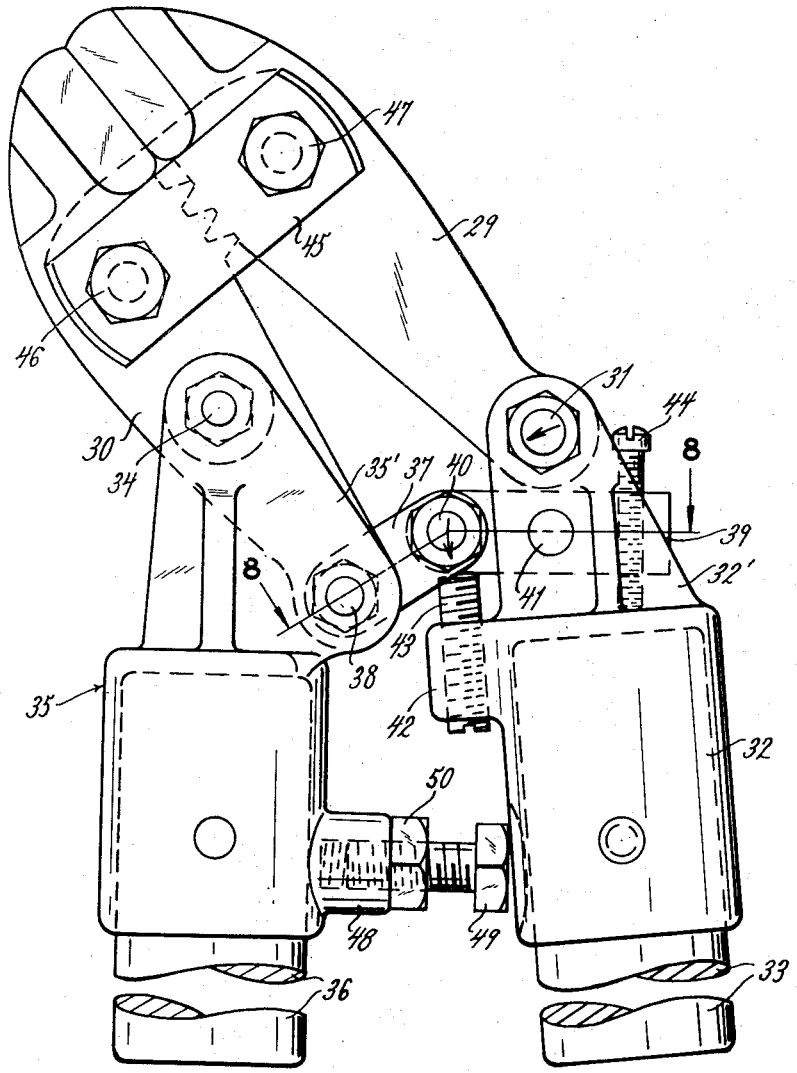
Fig. 7 is a fragmentary side elevation of a portion of the device illustrated in Fig. 6.
Figure 8:
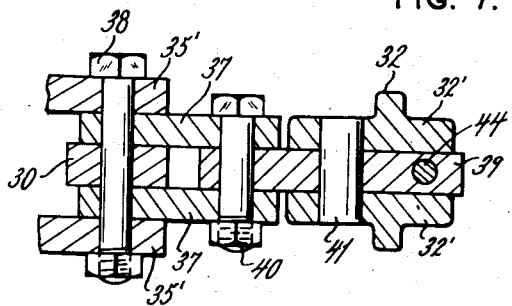
Fig. 8 is a section taken on line 8—8 of Fig. 7.

The cutting device illustrated by Figs. 6, 7, and 8 is of the two handle type, said cutting device being provided with blades 29 and 30. The blade 29 is pivoted at 31 to a bifurcated extension 32' of a bracket member 32 which is mounted at an end of an elongated handle 33, and the blade 30 has attached thereto at 34 a fitting 35 which is mounted at an end of a second elongated handle 36. The fitting 35 is provided with spaced portions 35', as is shown in Figs. 7 and 8, between which the lower portion of the blade 30 is disposed, end portions of a pair of links 37 also, being interposed between the spaced portions 35' of the fitting 35 with an end portion of each link 37 disposed between the blade portion and one of said spaced portions 35' of said fitting 35. The lower portion of the blade 30 and end portions of the links 37 are connected to the spaced portions 35' of the fitting 35 by a bolt 38, the opposite end portions of said links 37 being pivotally connected to a bar 39 by a bolt 40. A bar 39 is pivotally supported between the spaced legs of the extension 32' of the bracket member 32 by a pivot element 41 which extends through an opening formed through said bar and is seated at its opposite ends in openings formed in said spaced legs. The bracket member 32 is provided with an outstanding lug 42 which screwthreadedly supports in an opening formed therein an adjusting element 43, said adjusting element contacting at its upper end with a portion of the lower face of the bar 39 at one side of the pivot element 41. Also, the bar has formed therethrough at a point located at the opposite side of the pivot element 41 a screwthreaded opening which receives a second adjusting element 44, said adjusting element contacting at its lower end with the top face of the bracket member 32.

The blade 29 is supported for pivotal movement with respect to the blade 30 through the instrumentality of a pair of plates 45 which are located at opposite sides of the blades (only one of said plates being shown in Fig. 7), a bolt 46 which extends through openings formed through said plates 45 and through an opening formed through said blade 30, and a bolt 47 which extends through openings formed through the plates 45 and through an opening formed through the blade 29, the last-mentioned bolt serving as a pivot element about which said blade 29 is movable. Additionally, the fitting 32 mounted on the handle 36 is provided with a boss 48 having a screwthreaded opening that receives a shank portion of a bolt 49, said bolt 49 being adjustable inwardly and outwardly relative to the boss 48 and being locked in positions to which it has been adjusted by a lock nut 50 to provide an abutment with which the bracket member 32 of the handle 33 contacts to limit inward movement of the handle 33.

In the use of the cutting device illustrated by Figs. 6, 7, and 8, the elongated handle 36 is held by the operator and the handle 33 is moved outwardly to open the blades, during such movement the bolt 31 and the bolt 40 moving in the directions indicated by the arrows in Fig. 7. The opened blades are then applied to the article to be cut and the handle 33 is moved sharply toward the handle 36 to close the blades and sever the article being cut, the abutment bolt 49 arresting inward movement of the handle 33 when the bracket member 32 of said handle 33 contacts with said abutment bolt. In use of the structure illustrated by Figs. 6, 7, and 8 the blade 29 may be adjusted so that its cutting edge will just meet the cutting edge of the blade 30 when said cutting edges are brought forcibly together in performing a cutting operation. This adjustment may be obtained by adjusting the adjusting elements 43 and 44 so as to rock the bar 39 about its pivot element 41.

I claim:

1. A blade adjusting means for a cutting device comprising a pair of cutting blades provided with cutting edges, means for supporting one of said blades for pivotal movement with respect to the other of said blades, and means for subjecting said pivotally mounted blade to pivotal movement, said blade adjusting means being adapted for adjusting the position of the cutting edge of said pivotally mounted blade with respect to the cutting edge of the other blade in order that the cutting edges of said blades will cooperate properly on performance of a cutting operation, and said blade adjusting means including a pivotally supported bar, and adjusting elements for pivotally altering the position of said bar, said adjusting elements being disposed at opposite sides of the pivot of said bar.

2. A blade adjusting means for a cutting device comprising a pair of cutting blades provided with cutting edges, means for supporting one of said blades for pivotal movement with respect to the other of said blades, and means for subjecting said pivotally mounted blade to pivotal movement, said blade adjusting means being adapted for adjusting the position of the cutting edge of said pivotally mounted blade with respect to the cutting edge of the other blade in order that the cutting edges of said blades will cooperate properly on performance of a cutting operation, and said blade adjusting means including a pivotally supported bar, adjusting elements for pivotally altering the position of said bar, and an arm pivoted to said bar and to a part of said cutting device.

3. A blade adjusting means for a cutting device comprising a pair of cutting blades provided with cutting edges, means for supporting one of said blades for pivotal movement with respect to the other of said blades, and means for subjecting said pivotally mounted blade to pivotal movement, said blade adjusting means being adapted for adjusting the position of the cutting edge of said pivotally mounted blade with respect to the cutting edge of the other blade in order that the cutting edges of said blades will cooperate properly on performance of a cutting operation, and said blade adjusting means including a pivotally supported bar, adjusting elements for pivotally altering the position of said bar, and an arm pivoted to said bar and to a part of said cutting device, said adjusting elements being located at opposite sides of the pivot of said bar.

4. A blade adjusting means for a cutting device comprising a pair of cutting blades provided with cutting edges, means for supporting one of said blades for pivotal movement with respect to the other of said blades, and means for subjecting said pivotally mounted blade to pivotal movement, said blade adjusting means being adapted for adjusting the position of the cutting edge of said pivotally mounted blade with respect to the cutting edge of the other blade in order that the cutting edges of said blades will cooperate properly on performance of a cutting operation, and said blade adjusting means including a structure pivoted to said pivotally supported blade and having a pair of spaced parts, a bar supported between said spaced parts, and adjusting elements for altering the position of said bar.

5. A blade adjusting means for a cutting device comprising a pair of cutting blades provided with cutting edges, means for supporting one of said blades for pivotal movement with respect to the other of said blades, and means for subjecting said pivotally mounted blade to pivotal movement, said blade adjusting means being adapted for adjusting the position of the cutting edge of said pivotally mounted blade with respect to the cutting edge of the other blade in order that the cutting edges of said blades will cooperate properly on performance of a cutting operation, and said blade adjusting means including a structure pivoted to said pivotally supported blade and having a pair of spaced parts, a bar pivotally supported between said spaced parts, and adjusting elements for altering the position of said bar.

6. A blade adjusting means for a cutting device comprising a pair of cutting blades provided with cutting edges, means for supporting one of said blades for pivotal movement with respect to the other of said blades, and means for subjecting said pivotally mounted blade to pivotal movement, said blade adjusting means being adapted for adjusting the position of the cutting edge of said pivotally mounted blade with respect to the cutting edge of the other blade in order that the cutting edges of said blades will cooperate properly on performance of a cutting operation, and said blade adjusting means including a structure pivoted to said pivotally supported blade and having a pair of spaced parts, a bar pivotally supported between said spaced parts, and adjusting elements for altering the position of said bar, said adjusting elements being disposed at opposite sides of the pivot of said bar.

KENNETH R. RUNDE.

References Cited in the file of this patent

UNITED STATES PATENTS

| Number | Name | Date |
|---|---|---|
| 127,708 | Rhamy | June 11, 1872 |
| 1,679,022 | Caldwell | July 31, 1928 |
| 1,862,033 | Porter | June 7, 1932 |
| 2,185,673 | Luft | Jan. 2, 1940 |